United States Patent [19]
Fletcher et al.

[11] 3,729,935
[45] May 1, 1973

[54] SOLID PROPELLANT ROCKET MOTOR

[76] Inventors: James C. Fletcher, Administrator of the National Aeronautics and Space Administration with respect to the invention of; Warren L. Dowler, Sierra Madre; John I. Shafer, Pasadena; John W. Behm, San Pedro; Leon D. Strand, Pasadena, all of Calif.

[22] Filed: May 28, 1971

[21] Appl. No.: 147,996

[52] U.S. Cl. ............. 60/256, 60/254, 102/49.7, 102/49.8
[51] Int. Cl. ............................................ F02k 9/04
[58] Field of Search .............. 60/256, 254, 39.82; 102/49.3, 49.7, 49.8, 103

[56] References Cited

UNITED STATES PATENTS

| | | |
|---|---|---|
| 3,065,597 | 11/1962 | Adamson et al. ............ 60/254 |
| 2,561,670 | 7/1951 | Miller et al. ............ 60/256 |
| 3,250,829 | 5/1966 | Wall ............ 102/103 |
| 3,248,873 | 5/1966 | Pase ............ 60/39.82 E |

*Primary Examiner*—Carlton R. Croyle
*Assistant Examiner*—Robert E. Garrett
*Attorney*—Monte F. Mott, Wilfred Grifka and John R. Manning

[57] ABSTRACT

A solid propellant rocket motor having a controlled rate of thrust buildup to a desired thrust level by the combined utilization of a regressive-burning controlled flow solid propellant igniter and a progressive-burning main solid propellant charge wherein the igniter is capable of operating in a vacuum and sustaining the burning of the propellant below its normal L* combustion limit until the burning propellant surface and motor chamber pressure has increased sufficiently to provide a stable motor chamber pressure.

5 Claims, 5 Drawing Figures

Patented May 1, 1973

*INVENTORS*
WARREN L. DOWLER
JOHN I. SHAFER
JOHN W. BEHM
LEON D. STRAND

BY Wilfred Grifson
Monte F. Mott
ATTORNEYS

Patented May 1, 1973

INVENTORS
WARREN L. DOWLER
JOHN I. SHAFER
JOHN W. BEHM
LEON D. STRAND

BY

ATTORNEYS

SOLID PROPELLANT ROCKET MOTOR

ORIGIN OF THE INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

1. Field of the Invention

This invention is in the field of solid propellant rocket motors, more particularly the invention is in the field of solid propellant motors having low acceleration-rate ignition, useful where the vehicle cannot readily withstand high acceleration transients.

2. Description of the Prior Art

There is present interest directed toward orbit insertion missions at Jupiter, Saturn and Mercury which require low acceleration and low acceleration-rates. Thus only a low thrust, long burning motor would be suitable for such a mission. The contemplated orbital spacecraft for such missions require long, highly flexible appendages for the scientific instrumentation and for the radioisotope thermoelectric generator contemplated to be utilized. For a vehicle sensitive to performance and weight, such appendages dictate a maximum spacecraft acceleration at about 1 g thus inherently requiring low thrust and long burning times for outer planet orbit insertion motors. Further, and of concern to the herein invention, the flexible appendages necessitate low acceleration rates, referred to as g-Dots, during the starting and shut-down thrust transients in order to prevent limit cycling of the autopilot or damage to the equipment mounted on the appendages and the possibility of even snapping off or breaking the appendages. Although there have been recent missions which have had the requirement for the low acceleration rates, the requirements were met through the use of low thrust liquid propellant rockets. For the given vehicle constraints, i.e., dimensional envelope and performance of the propulsion system, solid propellant motors were unable to meet the low acceleration and acceleration rates required without unacceptable weight penalties. Typical solid propellant motors, when ignited, buildup thrust very rapidly at the rate of 5–50g/second. The thrust buildup desired for the presently discussed application, involves an ignition system that is capable of building up thrust at a controlled rate of less than 0.2g/second. In the past, there has been an attempt to control thrust buildup, though not to the degree mentioned, nor for the same reason.

The past effort was basically designed to provide an overall control of thrust during the operation of a solid propellant motor, not just in the ignition phase of operation. The most common previous approach was to utilize a variable throat area nozzle which, in some instances, was made of an ablative material or the use of a movable pintle nozzle where the effect of throat area is controlled by the movement of the pintle. These approaches are quite complex and costly. Further, the variable area concepts often pay a significant weight penalty due to the mechanical structural requirements to achieve the variation in the throat area. The variable throat area nozzle would be particularly utilized in the herein invention together with an inhibited progressive burning surface of a propellant charge so as to maintain the motor chamber pressure above the low-pressure combustion instability limit. Such a requirement has not previously existed and thus this technique had not been used, though the aforementioned problems of the variable area throat configurations indicate that such would not be preferable for the herein invention.

Another means for achieving the herein results would involve mounting additional small solid propellant motors onto the spacecraft to give a precise time sequence of thrust. This is once again quite expensive and a weight and packaging penalty is encountered. Further, the ability to obtain the precisely timed sequence would be difficult, if not impossible. As a result, this approach would require complex and expensive means for obtaining the precisely timed sequence. Thus, it is desirable to provide a simple, lightweight means for achieving a controlled buildup of thrust in a solid propellant motor.

SUMMARY OF THE INVENTION

Briefly, the herein invention comprises an ignition system for a solid propellant rocket motor which is capable of providing thrust at a controlled rate even though operation of the motor below its normal L* extinction pressure is required. This is achieved by utilizing a progressive burning solid propellant charge within a motor case. The charge or grain preferably is highly inhibited or restricted such that the burning area is insufficient initially to provide a stable motor pressure. Alternatively, a grain can be pre-designed to have a progressive burn without being inhibited. Thus, the herein invention provides an igniter that will ignite under all back pressure conditions and under low L* conditions. It ignites the nonrestricted portion of the inhibited propellant, for example, while providing the mass addition necessary to sustain combustion until the burning area of the propellant has increased sufficiently to provide a stable motor chamber pressure. The igniter utilized has a regressive long burning time grain design. In other words, until the burning area of the main motor propellant grain is sufficient to produce a stable motor chamber pressure, the contribution of the igniter gas to the main motor mass flow, is sufficient to maintain a high enough overall motor pressure to sustain stable operation. By having an independent controlled rate of flow from the igniter, one can further control the rate at which the thrust level is built up. In one embodiment of the invention, a plurality of externally mounted igniters can be utilized to achieve the purpose of this invention; while in another embodiment the igniter can be mounted within the chamber in the form of a torus surrounding the throat area injecting a gas in a circular pattern onto the exposed inhibited grain surface. The composition of the solid propellant grain and the composition of the solid igniter can be tailored or selected to achieve the desired results in accord with the methods set forth below and do not require new propellant formulations. The foregoing arrangement will provide a controlled low rate of thrust buildup due to the effect of the igniter until chamber pressure sufficient to sustain burning of the main motor is reached, thus providing the desired end results sought by this invention. It is believed that the invention will be further understood from the following detailed description and drawings.

DESCRIPTION OF THE PREFERRED EMBODIMENTS

It is well known in solid propellant technology that a solid propellant composition has an L* combustion limit. For a given propellant composition, experimental stability data have been correlated with the motor L* and chamber pressure. L* is defined as the free volume of the combustion chamber divided by the throat area of the nozzle. The motor L* limit is the point below which irregular combustion and extinguishment will occur for a given propellant. For a fixed throat area of the nozzle, the chamber pressure must exceed a certain limit (minimum) in order that stable combustion will occur or, in other words, that the L* limit must be surpassed. In normal solid propellant motors, the L* limit is reached almost immediately upon ignition, that is, within milli-seconds of ignition, such that immediately, stable combustion of the solid propellant grain is achieved. This, however, entails an extremely rapid acceleration rate or buildup of thrust.

In practice, operation of a motor near its normal L* combustion limit produces low frequency, low amplitude chamber pressure oscillation, characteristic of L* combustion instability near the extinction pressure of that motor. It is for this and other reasons that rocket motors have always been quickly brought up to and maintained beyond the L* limit to operate at low chamber pressure. If such oscillations can be tolerated by the vehicle, then it would be advantageous if one could ignite a solid propellant below the L* limit and maintain a main charge burning, while gradually bringing up the chamber pressure and thrust level to prevent the rapid acceleration. Concern about potentially unacceptable acceleration rates from oscillations produced in a rocket motor operating below its L* limit, led to a series of computer runs utilizing a spacecraft model to determine the effect of the initial acceleration during igniter initiation and acceleration rates during ignition on the spacecraft. It was found that a maximum initial acceleration of 0.4 g was acceptable. An acceleration rate during igniter burning of 0.4 g/second was also acceptable, whereas a maximum initial acceleration of 0.6 g and an acceleration rate during igniter burning of 0.6 g/second was unacceptable. Of course, these figures will vary depending upon given spacecraft mechanization and configuration. In view of the data, however, it was determined that a conservative value of 0.3 g maximum initial acceleration and an acceleration rate during igniter burning of 0.3 g/second could be adopted as design criteria for an ignition system. The maximum acceleration during normal burning of the motor was not to exceed 1.0 g.

Figure 1:
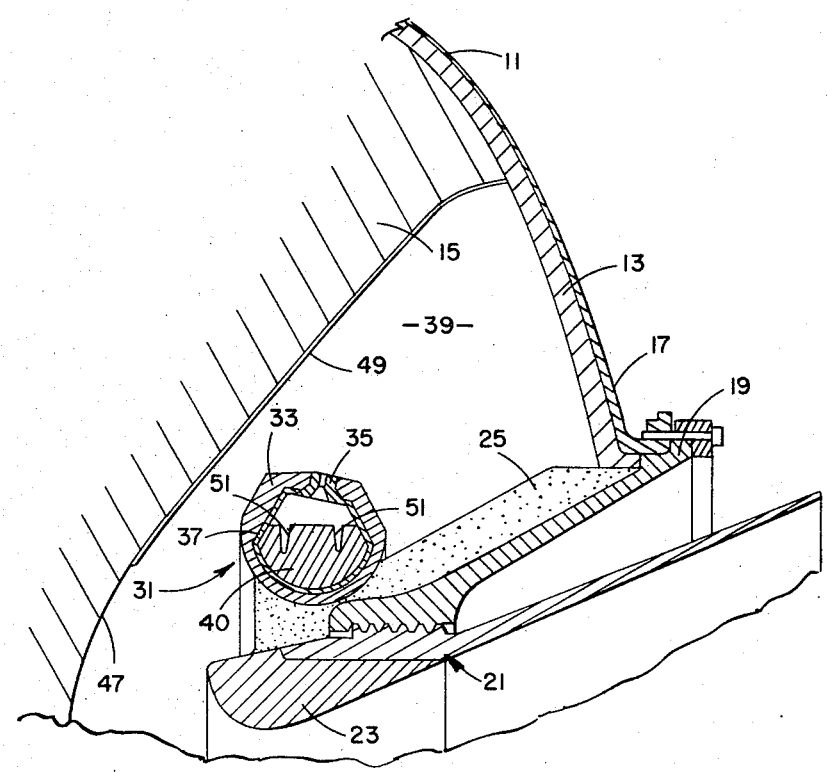
FIG. 1 is a typical cross sectional plan view of the motor of this invention.

Turning now to FIG. 1, there is seen a first embodiment of the herein invention which comprises a motor chamber 11 having an insulation 13 therein. An end burning main propellant charge 15 is disposed within the chamber 11 and bonded to the insulation 13 in a conventional manner by chemical reaction between the insulator surface and the propellant during propellant thermal curing. At an aft end 17 of the motor, there is connected a fitting 19 which supports a motor nozzle 21. The nozzle 21 can have a throat insert 23 of graphite or other suitable material. The construction of the motor casing and attachment of nozzle 21 thereto is conventional in the art and does not form part of this invention. Surrounding the nozzle support element 19 within the chamber is a layer of insulation 25 which can be of an ablative type material and serves to insulate both the support 19 and portion of the nozzle from the heat generated within the chamber. Alternative to the restricted end burning grain, a radial burning non-inhibited grain could be provided in order to achieve the desired progressive burn.

Figure 2:
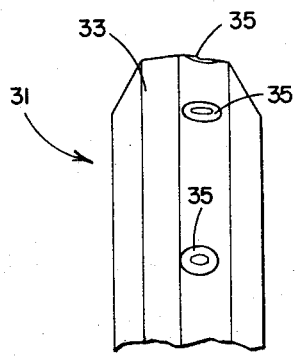
FIG. 2 is a fragmentary detail of the igniter of FIG. 1.

In the embodiment of FIG. 1 an internal igniter 31 is utilized, mounted on the insulation layer 25 surrounding the nozzle support 19. The internal igniter 31 is thus in a form of a torus having an outer case 33 of for example polycarbonate or other thermoplastic material having a plurality of nozzles 35 spaced about the case and firing radially outwardly into the main chamber area 39. The nozzles 35 can be silica phenolic or other similar material. A fragmentary detail of the igniter is seen in FIG. 2. A layer 37 of insulation coats the inside of the igniter shell 33 and bonds an igniter charge 40 thereto. The insulation can be of a conventional rubber composition utilized in igniter or solid propellant technology.

Figure 3:
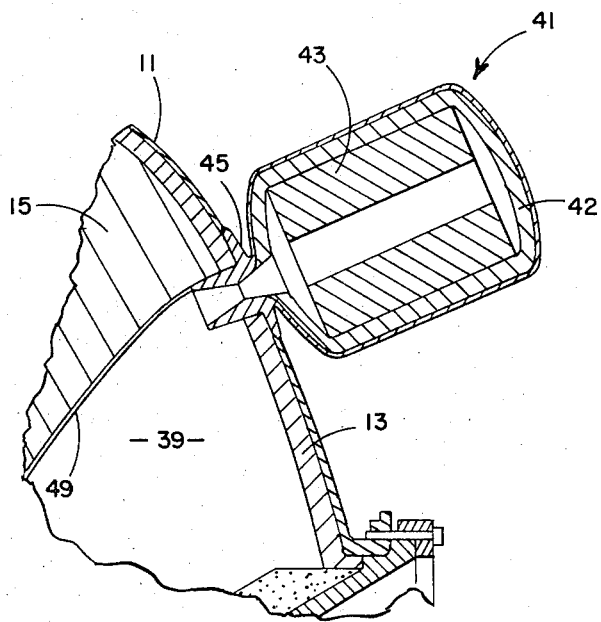
FIG. 3 is a typical cross sectional view of a second embodiment of a motor in this invention.

FIG. 3 discloses an alternate embodiment of this invention having the same overall construction as shown in FIG. 1 except that in place of the torus igniter 31 mounted internally within the chamber, one or more external igniters 41 can be utilized having an igniter charge 43 located therein. The external igniter requires a thick layer of insulation 42 so that it will not burn out prior to the main motor charge. The external igniter 41 can be connected to the outer case 11 such that gases therefrom are directed through a nozzle 45 into the main chamber 39.

Figure 4:
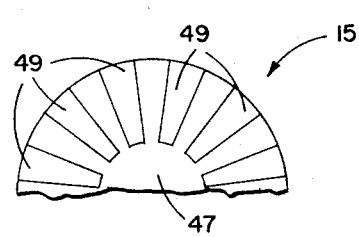
FIG. 4 is a typical cross sectional view of the inhibited end of a main solid propellant charge of this invention.

In both the embodiments the exposed end 47 of the main propellant charge 15 is highly inhibited initially as seen in FIG. 4 wherein a plurality of inhibitor strips 49 are radially disposed about the exposed face of the charge. The inhibiting strips 49 can, for example, be comprised of ablative elastomeric insulation material which is bonded to the face of the propellant in a normal manner utilized for inhibitors in solid propellant technology.

Figure 5:
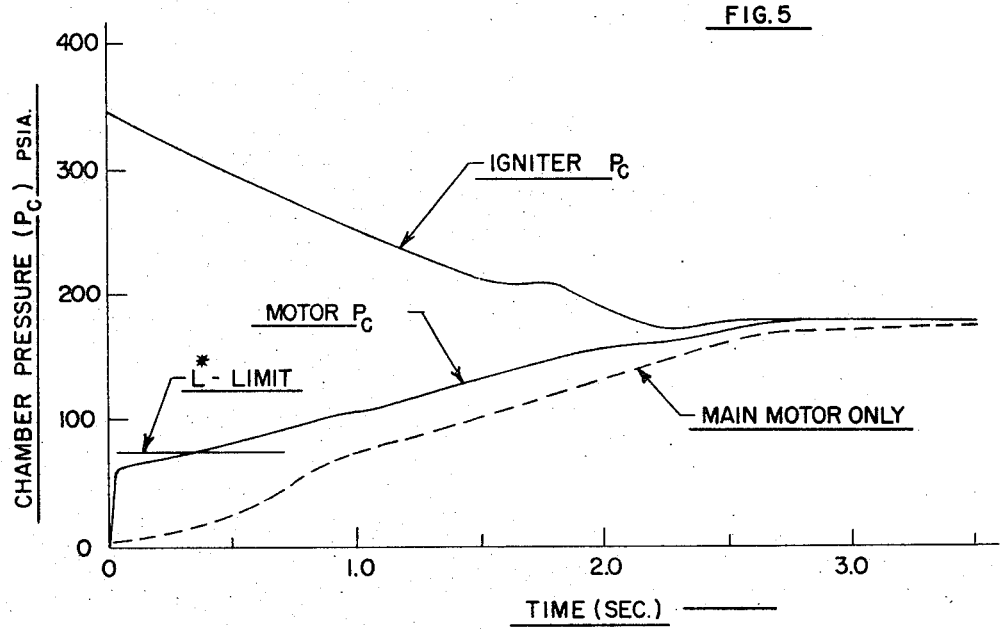
FIG. 5 is a typical graph of the pressure versus time curves of a motor of this invention.

Turning now to FIG. 5, there is seen a typical graph which explains the operation of the motors of this invention. When the igniter is ignited it acts as a small solid propellant motor that burns with sonic exhaust for about 1½ seconds of independent operation of, for example, its 2½ second burning time, if such periods are selected. The combustion gases in the torus version shown in FIG. 1 pass radially outward from the nozzles provided impinging on the dish-shaped propellant surface 47. Typical igniter pressure could decrease from 350 psi to about 180 psi. The decay is shown in FIG. 5. The main motor propellant surface which is highly inhibited, to produce a highly progressive burning surface as the propellant regresses under the inhibitor surface, would have a typical burning curve as shown in the dotted line of FIG. 5, if it could burn at a very low pressure by itself where its initial pressure would be only 5 to 10 psia. In reality, because of the L* combustion limit of about 65 psia for the system of this example, the motor would not burn by itself below that pressure. However, when the hot exhaust gases from the independent controlled flow igniter are injected into the main motor chamber 39, the mass addition raises pressure to about 50 to 55 psi and the burning of the main charge is sustained below its L* limit by heat transfer and mass addition. The resultant low pressure and thrust level permits the spacecraft to meet its 0.3 g initial acceleration requirement. Thus, the motor will effectively be operating as indicated by the line marked motor $P_c$ which is the effective result of the contribution of the gases from both the main motor and the igniter.

The main propellant burning surface, and consequently the chamber pressure, will increase with time in a controlled manner, until the motor is able to sustain combustion without mass addition from the igniter. The small thin inhibitor strips 49 are partially or completely consumed before being ejected out of the nozzle. The pressure-time relationship shown in FIG. 5 represents nominal performance values. In practice, however, operation of the main motor below its normal L* combustion limit, has produced low frequency, low amplitude oscillations characteristic of L* combustion instability near the extinction pressure.

The reason it is believed the herein inventive concept is successful is first related to the fact that the burning and stability of the main motor charge is directly affected by the pressure developed within chamber 39 of the motor. In other words, the propellant combustion and the gases generated by such burning from the main charge, is directly coupled to the chamber 39 and there is thus the aforementioned interdependence between the developed chamber pressure and stable burning of the main charge. On the other hand, the igniter is so designed that it will burn and continue burning independently of the back pressure developed in chamber 39 and is only dependent upon its own chamber pressure within the igniter case itself. In other words, unlike the main charge, there is no coupling effect due to the sonic flow in the igniter nozzles, between the pressure in motor chamber 39 and burning performance of the igniter, so that the igniter can maintain gas and mass flow production regardless of what is occuring within the chamber 39. As shown in FIG. 5, the production of gas or mass flow from the main motor would not reach the L* limit until 1 second had elapsed in this embodiment. Yet through the contribution of the mass flow from the igniter, the motor has a $P_c$ (chamber pressure) curve as shown such that it will operate at acceptably stable conditions even below the L* limit of the main motor charge for almost the first one-half second of operation. Since the major contribution to mass flow is derived from the igniter charge during initial acceleration over the first second of operation, during which period the main motor is not dependent upon its own gas generating capacity to fully develop the desired main motor chamber pressure, one can thus control the rate of acceleration through the design of the igniter.

Experimental results have been used to determine the igniter mass flow rate/main motor mass flow rate ratio as a function of burning time to establish minimum motor resultant pressure and thrust at the preferred motor L* value. The farther below the L* limit one wants to operate, the larger the igniter contribution required. The amplitudes of the pressure oscillations that occur below the L* limit grow slowly with time, thereby increasing the oscillatory acceleration (g-dots). This would limit how long one would want to burn below the L* limit.

Since it is contemplated that the herein motors will be utilized in the hard vacuum of outer space, ignition of the igniter is important. The ignition involves the addition of external heat to the igniter propellant at a rate such that its own subsequent decomposition and combustion produce sufficient heat to sustain further decomposition and burning when the external heat source is withdrawn. The process is complicated especially in a vacuum by the propellant low pressure deflagration limit, that is the pressure below which the propellant will not burn (exclusive of igniter L* limits), the short residence times for igniter combustion gases and the rapid decrease in pressure that can quench the burning. As a result, a material such as Pyrofuze, made by Sigmund-Cohn Co., which is a coaxial wire with an aluminum core surrounded by palladium in intimate contact with the core, can be used. Pyrofuze has a property that upon being heated electrically or chemically to 1,220°F which is the melting point of aluminum, it instantaneously generates a large exotherm under gas pressure or in a vacuum due to a resulting alloy. The temperature of the wire can reach 5,000°F, well above the 400° to 800°F ignition temperature range of most solid propellants. The Pyrofuze wires can thus be imbedded into the propellant charge 40 of the igniter composition within slots 51 provided therein. Other conventional ignition materials can also be used in place of the Pyrofuze.

When current is passed through the Pyrofuze, burning would be initiated throughout the charge circumference on the bottom of the slot so that hot combustion gases must pass over the walls of the slot to reach the nozzle, thus promoting flame spreading and tending to raise the pressure locally near the line of ignition. Various other means can be devised for effectively igniting the igniter charge in a hard vacuum which do not form part of the herein invention.

EXAMPLE

The test motor utilized to demonstrate the feasibility of the present invention had a 5 inch inside diameter and was 6 inches long. The propellant charge was cast and pressure cured in the motor chamber. The restrictor configuration utilized was cut from a Gen GARD V-52 rubber made by General Tire and Rubber Company, that had been cured to the desired thickness and bonded to the propellant surface with cement. The restrictor essentially covered all of the end of the grain leaving four slots having a width of 0.14 inch, each slot passing through the center of the grain and extending within one-eighth inch of the outer diameter. Thus, the end surface of the propellant grain was severely inhibited. The propellant formulation was comprised of 64 weight percent ammonium perchlorate, 16 weight percent aluminum, 16.3530 weight percent hydroxyl terminated polypropylene oxide, 0.2946 weight percent Alrosperse, which is a surface active agent made by Geigy Chemical Corporation, 0.231 weight percent trimethylol propane, 0.4873 weight percent 1-decanol, 2.3463 weight percent 2-6 toluene diisocyanate, 0.0369 weight percent ferric acetyl acetonate, and 0.2500 phenyl beta napthylamine. The length of the propellant grain was 1.5 inches, while the weight of the propellant was 1.76 pounds. The restrictor had a thickness of 0.25 inch. Thus, the initial burning area of the propellant was 2.7 square inches which was equivalent to 14 percent of the total area of the end of the propellant. The nozzle throat diameter of the motor was 0.432 inches. Thus, the initial ratio of propellant burning area to nozzle throat area was 20. A single external igniter was utilized at a 3-inch inside diameter and was 4 inches long. The end-burning igniter charge was in turn ignited by a pyrotechnic paste initiator system. The formulation of the igniter charge was 78 weight percent ammonium perchlorate, 2 weight percent aluminum, 17.3073 weight percent hydroxyl terminated polypropylene oxide, 0.4677 weight percent Alrosperse, 0.0554 weight percent trimethylol propane, 1.8696 weight percent 2-6 toluene diisocyanate, 0.0500 weight percent ferric acetyl acetonate, 0.2500 weight percent phenyl beta napthylamine.

The test was highly successful. Pressure traces of the igniter and main motor were obtained. Post-test inspection revealed restricter segments wedged in the nozzle entrance, but no blocking of the nozzle. The main motor pressure exhibited low frequency oscillations, over a fairly distinguishable interval of approximately 3.5 seconds. The oscillations, which appeared to begin at a chamber pressure of approximately 17 psia, grew in amplitude with increasing pressure, and reached a maximum of 19 percent of the mean pressure at a pressure of approximately 28 psia; then rapidly dampened out and approached zero at a pressure of approximately 40 psia. The very low amplitude oscillations appeared to continue as the pressure increased, but were difficult to distinguish from the erratic pressure perturbations and instrumentation "noise" that occurred throughout the run. The frequency of the oscillations grew from an initial value of 5 Hz (5 cycles per second) to a value of 10 Hz at 30 psia. At their maximum amplitude the pressure oscillations gave rates of change of pressure of 160–200 psi/s.

The fact that the main motor pressure began to oscillate independently in a nonacoustic fashion at a pressure of approximately 17 psia indicates that ignition has occurred at or before this point. The initial $L^*$ (free volume/nozzle throat area) of the main motor for this test was approximately 350 inches. From the $L^*$-motor stability data, the low-pressure combustion limit for the propellant at an $L^*$ of 350 inches is between 45 and 50 psia. It was concluded, therefore, that the feasibility of the g-dot ignition concept had been demonstrated, in that a motor was ignited below its low-pressure $L^*$ combustion limit and successfully made the transition to the stable operating region in a controlled manner.

What is claimed is:

1. A solid propellant motor capable of controlled acceleration comprising:

a motor chamber, having a nozzle affixed thereto;

a main solid propellant grain within said chamber having a progressive burning surface and an inhibited end burning design such that the burning area of the end of said grain during an initial ignition interval generates pressure below the extinction pressure of said motor chamber and would not initially sustain stable combustion when ignited and said progressive burning surface when sufficiently ignited after said interval provides a chamber pressure above the extinction pressure which is independently capable of sustaining stable combustion;

and at least one solid propellant igniter connected to said chamber, said igniter being capable of supplying sufficient mass flow to said motor chamber at a controlled rate for a period no longer than said interval to raise the chamber pressure above the extinction pressure whereby said motor will maintain stable combustion conditions during and after said interval.

2. The motor of claim 1 wherein:

said igniter is disposed externally of said motor chamber.

3. The motor of claim 1 wherein:

said igniter is disposed within said motor chamber.

4. The motor of claim 3 wherein:

said toroidal igniter has a plurality of nozzles therein for directing said gas to said grain.

5. A solid propellant motor capable of a controlled rate of acceleration comprising:

a motor chamber, having a nozzle affixed thereto;

a main solid propellant grain within said chamber having a progressive burning surface such that said grain would not initially sustain stable combustion when ignited;

and at least one solid toroidal propellant igniter disposed in said chamber for directing gas to said main propellant grain, said igniter being capable of supplying sufficient mass flow to said motor chamber at a controlled rate whereby said motor will maintain stable combustion conditions.

* * * * *